United States Patent [19]

Okura

[11] Patent Number: 4,668,047

[45] Date of Patent: May 26, 1987

[54] LENS HOLDING SYSTEM

[75] Inventor: Zenichi Okura, Tokyo, Japan

[73] Assignee: Asahi Kogaku Kogyo Kabushiki Kaisha, Tokyo, Japan

[21] Appl. No.: 739,674

[22] Filed: May 31, 1985

[30] Foreign Application Priority Data

Jun. 1, 1984 [JP] Japan .................... 59-112434

[51] Int. Cl.⁴ .................... B02B 7/02; F16L 23/02
[52] U.S. Cl. .................... 350/252; 285/330; 350/253; 403/335
[58] Field of Search .................... 350/247, 252–253, 350/257; 354/286; 403/326, 335–337; 285/330, 405, 921

[56] References Cited

U.S. PATENT DOCUMENTS

| | | | |
|---|---|---|---|
| 2,404,385 | 7/1946 | Fritts | 403/337 |
| 3,135,538 | 6/1964 | George | 285/363 |
| 3,671,108 | 6/1972 | Kilgus | 350/253 |
| 3,950,014 | 4/1976 | Doubleday | 285/921 |
| 3,961,349 | 6/1976 | Forsyth et al. | 354/286 |
| 4,193,617 | 3/1980 | Hitz | 285/363 |
| 4,313,649 | 2/1982 | Morikawa et al. | 350/252 |

FOREIGN PATENT DOCUMENTS

| | | |
|---|---|---|
| 57134 | 8/1982 | European Pat. Off. |
| 1384638 | 11/1964 | France ............ 285/921 |
| 251889 | 9/1948 | Switzerland ........ 350/252 |

Primary Examiner—William H. Punter
Attorney, Agent, or Firm—Finnegan, Henderson, Farabow, Garrett and Dunner

[57] ABSTRACT

A lens holding system is provided for the rear lens system of a camera lens arrangement having front and rear lens systems divided by a shutter housing. The lends holding system includes a first lens holder for biasing the rear lens system in a first axial direction, a second lens holder for biasing the rear lens system in a direction opposite the first axial direction, the first and second lens holder including respective first and second coupling parts extending from peripheral portions of the respective lens holders for interengagement and for supplying the biasing through elastic deformation of at least one of the first and second coupling parts.

8 Claims, 6 Drawing Figures

FIG. 3
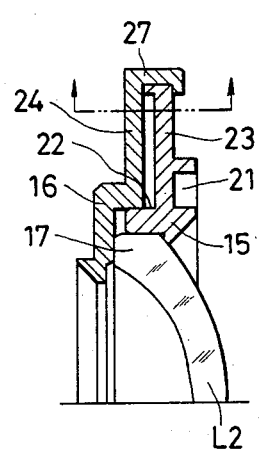
FIG. 4
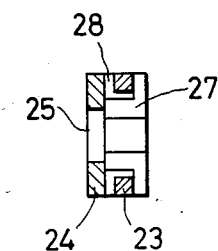
FIG. 5
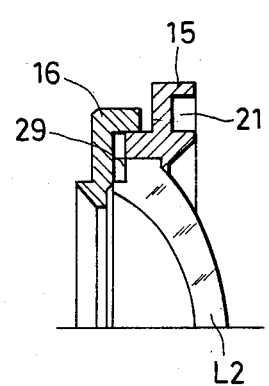
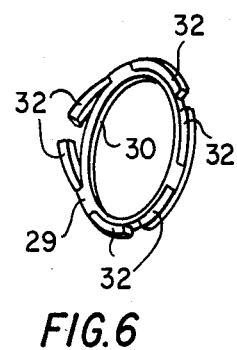
FIG. 6

LENS HOLDING SYSTEM

BACKGROUND OF THE INVENTION

1. Field of the Invention

The invention relates to a lens holding frame for a camera lens system, in particular, one which is divided into front and rear lens system by a shutter housing.

2. Description of the Related Art

Camera lens systems have been known to include a front lens group for focusing. Such a front lens group is located in front of a shutter housing in such a manner that focusing is accomplished by axial movement at the front lens group. Such a lens system has been known to include a rear lens group arranged behind the shutter housing. A satisfactory optical characteristic can be obtained by setting the optical axis eccentricity accuracy of the front and rear lens group to 0.05 mm or less.

The optical axis eccentricity accuracy depends on adjustment of the components when assembled, or the dimensional accuracy of each component. However, it is difficult to increase the optical axis eccentricity accuracy to a desired value because a relatively large number of components are employed and because the desired value is relatively high. In general, the rear lens group of the camera lens system is made up of plastic lenses because such lenses can be readily molded and because the required lenses are intricate in configuration. The optical characteristic is lowered if the stress-strain or the play of the lenses caused by thermal expansion or contraction of the lenses is not absorbed.

An object of this invention is to provide a lens holding frame for a camera in which the optical axis can be readily adjusted, and in which the stress-strain or the play of lenses caused by thermal expansion or contraction of the lenses can be absorbed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a lens holding system for at least one lens having an optical axis is provided comprising: first holding means for biasing the lens in a first axial direction; second holding means for biasing the lens in a direction opposite the first axial direction; the first and second holding means including respective first and second coupling means extending from peripheral portions of the respective holding means for interengagement and for supplying the biasing through the elastic deformation of at least one of the coupling means.

BRIEF DESCRIPTION OF THE DRAWINGS

The accompanying drawings, which are incorporated in and constitute a part of the specification, illustrate a preferred embodiment of the invention and, together with a general description of the invention given above in the detailed description of the preferred embodiment given below, serve to explain the principles of the invention.

FIG. 3 is a sectional view of the lens holding system shown in FIG. 2;

FIG. 4 is a sectional view taken from the direction of the arrow in FIG. 3;

FIG. 5 is a sectional view of a second embodiment of a lens holding system incorporating the teachings of the present invention; and FIG. 6 is an isometric view of the leaf spring shown in cross section in FIG. 5.

DESCRIPTION OF THE PREFERRED EMBODIMENT

Reference will now be made in detail to the present preferred embodiment of the invention as illustrated in the accompanying drawings.

Figure 1:
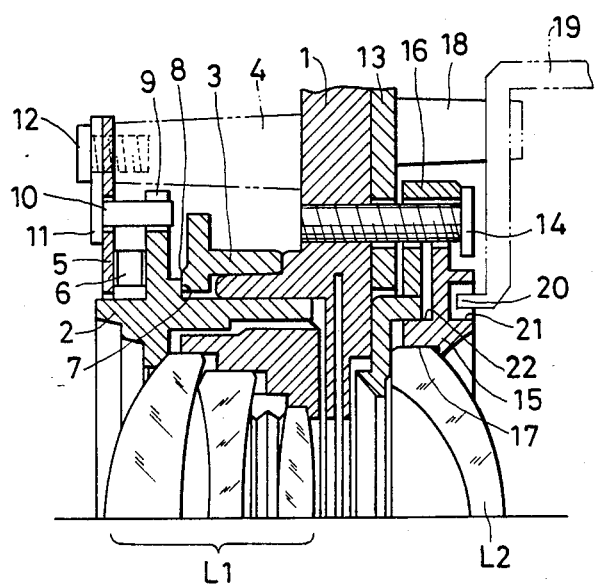
FIG. 1 is a cross-sectional view of one embodiment of a lens holding system incorporating the teachings of the present invention.

FIG. 1 is a sectional view showing one embodiment of this invention. A front lens group frame 2 integral with a front lens group L1 is slidably fitted in the front end portion of a shutter housing 1, and a drive ring 3 is rotatably assembled on the front end portion. A leaf spring 6 is provided between the front lens group frame 2 and a retaining plate 5 secured to a support 4 which is integral with the shutter housing 1. The leaf spring 6 urges the front lens group frame 2 to the right in FIG. 1. A thrust cam surface 7 provided in the end face of the front lens group frame 2 is maintained in contact with a cam follower 8 provided in the end face of the drive ring 3.

A pin 10 is inserted into a slot 9 formed in the peripheral portion of the front lens group frame 2. The pin 10 is integral with an adjusting plate 11, and is fixed with respect to the support 4 by a screw 12 which is inserted into an elongated hole (not shown) formed in the adjusting plate 11. By turning the drive ring 3, the front lens group frame 2 is axially moved, while being guided by the pin 10.

Circuit components (not shown) for controlling the operation of the shutter and the rotation of the drive ring 3 are provided on a base plate 13 which is secured to the rear end of the shutter housing 1.

A lens holding frame secured to the rear end of the shutter housing 1 with a screw 14 is made up of a rear lens group frame 15 and a retaining frame 16. A rear lens group L2 is inserted into the rear lens group frame 15. A rear circumferential recess 21 is formed in the rear lens group frame 15. The circumferential protrusion 20 of a light shielding cylinder 19 which is secured to a support 18 integral with the shutter housing 1 and integral with the film chamber is inserted into the rear circumferential recess 21. The retaining frame 16 is put on the rear lens group frame 15.

Figure 2:
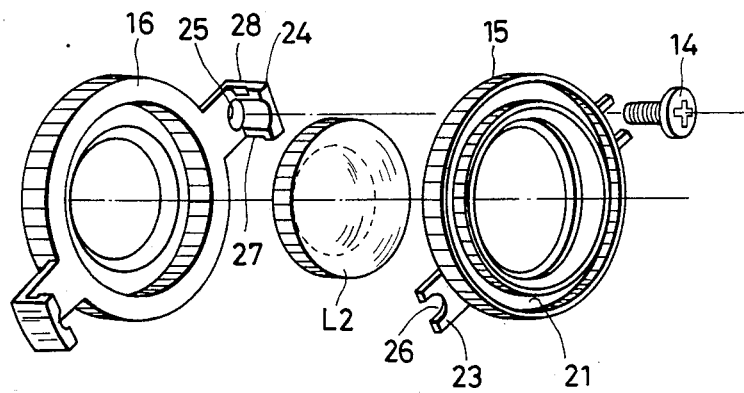
FIG. 2 is an exploded perspective view of the lens holding system shown in FIG. 1.

A lens holding system for rear lens group L2 comprises first holding means for biasing the lens in a first axial direction; second holding means for biasing the lens in a direction opposite the first axial direction; the first and second holding means including respective first and second coupling means extending from peripheral portions of the respective holding means for interengagement and for supplying the biasing through elastic deformation of at least one of the coupling means. As shown in FIGS. 2, 3 and 4, first holding means includes rear lens group frame 15, and the second holding means includes retaining frame 16. First coupling means includes coupling parts 23 which extend outward from rear lens group frame 15. Second coupling means includes coupling parts 24 which extend outwardly from retaining frame 16.

Each coupling part 24 of the retaining frame 16 has means for accommodating a headed fastener such as mounting hole 25 whose diameter is larger than the diameter of the mounting screws 14. Each coupling part 24 also includes recess means comprised of notches 28 on the radially inward surface of axially extending portions 27 which are engaged with the forked free ends of coupling part 23 of the rear lens group frame 15. Intermediate groove 26 serves as means in rear lens group frame 15 for accommodating a headed fastener. The dimensions, in the direction of the optical axis, of the recessed parts 28 and the coupling part 23 cause elastic deformation of one or both of the coupling parts 23 and 24 so that the rear lens group L2 is urged in the direction of the optical axis under the conditions shown in FIG. 3. When the rear lens group frame 15 is combined with the retaining frame 16, the protrusions 27 are engaged with the forked free end and groove 26. Such elements serve as means for preventing rotational and axial movement of rotation of the rear lens group frame 15 relative to the retaining frame. This prevents the rear lens group frame 15 from being unintentionally disengaged from the retaining frame 16.

FIG. 5 is a sectional view showing another example of the connection of the rear lens group frame 15 and the retaining frame 16. This embodiment may use the coupling means of FIGS. 1 through 4, or other coupling means may be used. Resilient means such as a leaf spring arrangement 29, shown in FIGS. 5 and 6, is interposed between the retaining frame 16 and the rear lens group L2. The page leaf spring 29, depicted in cross-section in FIG. 5 and in isometric view in FIG. 6, may be of various configurations. One particular configuration operable with this embodiment has a circumferential inner ring-like portion 30 and a plurality of outer arcuate arms 32 affixed thereto. The arms are bent such that end portions engage the retaining frame 16 while the attached circumferential portion biases the lens group L2 axially into lens group frame 15 by engaging the outer circumferential portion of the lens group L2. In this embodiment the lens group L2 is not in contact with the retaining frame 16. This method is employed to decrease (or increase) the force of energization which is applied to the rear lens group L2 in the direction of the optical axis because of the material of the rear lens group L2.

As is apparent from the above description, the lenses in the lens holding frame according to the invention are held elastically in such a manner that the force from the lens holding system is applied to the lenses in the direction of the optical axis. Accordingly, even if the lenses are expanded or contracted with temperature, the rear lens group frame and the retaining frame are moved in the direction of the optical axis, thus absorbing the stress-strain of the lenses, or the play of the lenses.

In the lens holding frame, the elastic coupling parts are supported on the shutter housing with the screws. Therefore, when the pins or the like which are finely movable in a plane perpendicular to the direction of the optical axis are engaged with the recess in the rear end of the rear lens group frame, adjustment of the optical axis with respect to the front lens group can be achieved irrespective of the positions of the circuit components mounted on the circuit board on the shutter housing.

The rear lens group can be assembled to the lens holding frame by pushing the retaining frame with the rear lens group into the lens frame. Therefore, without touching the lenses directly, the latter can be mounted on the shutter housing, which facilitates the assembling work. If the lens frames and the retaining frame are made of opaque material such as black plastic, light can be prevented from coming into the region from the front lens group to the film through the shutter housing without using a light shielding material such as moquette.

The present invention can be achieved even if the arrangement of the coupling parts of the rear lens group frame and the retaining frame and reversed.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concept.

What is claimed:

1. A lens holding system for holding a first lens of a camera lens arrangement to prevent eccentricity beyond a selected tolerance, due to temperature variations, of an optical axis of said first lens and an optical axis of a second lens included in the camera lens arrangement, comprising:
   first holding means for biasing said first lens in a first axial direction;
   second holding means for biasing said first lens in a direction opposite the first axial direction;
   said first and second holding means including respective first and second coupling means extending from peripheral portions of respective holding means for interengagement and for supplying said biasing through elastic deformation of at least one of said coupling means wherein said first coupling means includes a radially extending portion having a free end portion, and said second coupling means includes an axially extending portion with recess means for engaging the free end portion and axially retaining the first coupling means in relation to the second coupling means to prevent relative rotation between said first and second coupling means and eccentricity, beyond said selected tolerance, of said optical axes of said first and second lenses.

2. A lens holding system as claimed in claim 1 further comprising resilient means interposed between said first and second holding means for biasing said first and second holding means axially away from each other.

3. A lens holding system as claimed in claim 2 wherein said resilient means comprises a leaf spring arrangement.

4. A lens holding system as claimed in claim 1 wherein each of said first and second coupling means includes means for accommodating a headed fastener.

5. A lens holding system as claimed in claim 1, wherein said recess means comprises notches on the radially inward side of said axially extending portion of said second coupling means.

6. A lens holding system for holding a rear lens system of a camera lens arrangement having an optical axis and front and rear lens systems divided a shutter housing, to prevent eccentricity beyond a selected tolerance, due to temperature variations, of the optical axis of said rear lens system and the optical axis of said front lens system, comprising:

first holding means for biasing the rear lens system in a first axial direction;

second holding means for biasing the rear lens system in a direction opposite the first axial direction;

said first and second holding means including respective first and second coupling means extending from peripheral portions of the respective holding means for interengagement and for supplying said biasing through elastic deformation of at least one of said first and second coupling means wherein said first coupling means includes a radially extending portion having a free end portion, and said second coupling means includes an axially extending portion with recess means for engaging the free end portion and axially retaining the first coupling means in relation to the second coupling means to prevent relative rotation between said first and second coupling means and eccentricity, beyond said selected tolerance of said said optical axes of said front and rear lens systems.

7. A lens holding system as claimed in claim 6 wherein one of said first and second holding means is rear of the other and includes a rear axial surface with a rear circumferential recess.

8. A lens holding system for holding a first lens of a camera lens arrangement to prevent eccentricity beyond a selected tolerance, due to temperature variations, between an optical axis of said first lens and an optical axis of a second lens included in the camera lens arrangement, comprising:

first holding means for biasing said first lens in a first axial direction;

second holding means for biasing said first lens in a direction opposite the first axial direction;

said first and second holding means including respective first and second coupling means extending from peripheral portions of the respective holding means for interengagement and for supplying said biasing through elastic deformation of at least one of said coupling means, wherein first coupling means includes at least two first flanges extending radially outward, each first flange having a forked free end portion, said second coupling means includes at least two second flanges, each second flange extending first radially outward and then extending axially, the axially extending portion of each second flange having a radially inner surface with notches therein for engaging the forked free end portion of one of said first flanges and preventing relative axial and radial movement between the first and second coupling means.

* * * * *